(12) United States Patent
Kampeas et al.

(10) Patent No.: US 11,438,627 B2
(45) Date of Patent: Sep. 6, 2022

(54) RATE ADAPTIVE ENCODING DECODING SCHEME FOR PRIORITIZED SEGMENTED DATA

(71) Applicant: GM GLOBAL TECHNOLOGY OPERATIONS LLC, Detroit, MI (US)

(72) Inventors: Joseph Kampeas, Ramat-Gan (IL); Ronit Bustin, Kfar Saba (IL); Eran Kishon, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/131,740

(22) Filed: Dec. 22, 2020

(65) Prior Publication Data

US 2022/0201333 A1 Jun. 23, 2022

(51) Int. Cl.
*H04N 19/44* (2014.01)
*H04N 19/61* (2014.01)
*H04N 19/176* (2014.01)
*H04N 19/46* (2014.01)

(52) U.S. Cl.
CPC ........... *H04N 19/61* (2014.11); *H04N 19/176* (2014.11); *H04N 19/44* (2014.11); *H04N 19/46* (2014.11)

(58) Field of Classification Search
CPC ...... H04N 19/61; H04N 19/176; H04N 19/44; H04N 19/46
See application file for complete search history.

(56) References Cited

U.S. PATENT DOCUMENTS

| 8,363,548 | B1 * | 1/2013 | Aboul-Magd | .......... H04L 47/32 370/235 |
| 2003/0072376 | A1 * | 4/2003 | Krishnamachari | ... H04L 1/0003 375/240.26 |

(Continued)

*Primary Examiner* — Dave Czekaj
*Assistant Examiner* — Berteau Joisil
(74) *Attorney, Agent, or Firm* — Lorenz & Kopf LLP

(57) ABSTRACT

A method in a rate adaptive system includes categorizing, by an encoder, a plurality of clusters of data in a segmented image into one of a plurality of categories corresponding to a different predetermined label with a predetermined priority level; vectorizing, by the encoder, the data to generate a sparse vector $x_i$ for its corresponding label; encoding, by the encoder, a plurality of the sparse vectors $x_i$ by multiplying a measurement matrix $A_i(t)$ with the sparse vector $x_i$ to generate a set of encoded information $y_i$; transmitting, by the encoder to the decoder, the plurality of sets of the encoded information $y_i$ in a prioritized order; decoding, by the decoder, the plurality of sets of encoded information $y_i$ to determine the plurality of the sparse vectors $x_i$ based on determining measurement matrix $A_i(t)$; and uniting the plurality of the sparse vectors $x_i$ into a single image frame.

20 Claims, 7 Drawing Sheets

(56) References Cited

U.S. PATENT DOCUMENTS

2014/0193076 A1\* 7/2014 Gardiner ................. G06T 9/00
                                                                382/190
2018/0240335 A1\* 8/2018 Dong ..................... G08G 1/056
2019/0385063 A1\* 12/2019 Yu ......................... G06N 3/084

\* cited by examiner

RATE ADAPTIVE ENCODING DECODING SCHEME FOR PRIORITIZED SEGMENTED DATA

TECHNICAL FIELD

The present disclosure relates generally to perception systems and methods and more particularly to systems and methods for sharing segmented images.

Sensor sharing for vehicles may have considerable benefits. However, there can be many difficulties with sensor sharing. The massive amounts of data produced by a vehicle may not be shared indiscriminately due, for example, to the cost of data transmission and the high potential latency of communication, which can render the data irrelevant. Standard compression methods do not exploit the sparse nature of segmented input that can be found in images, cannot reach high compression rates, and are hard to adapt on-the-fly to optimize the channel throughput.

Accordingly, it is desirable to provide systems and methods that can exploit the sparse nature of segmented input to allow for sensor sharing. Furthermore, other desirable features and characteristics of the present invention will become apparent from the subsequent detailed description and the appended claims, taken in conjunction with the accompanying drawings and the background of the invention.

SUMMARY

Systems and methods are disclosed for providing rate adaptive perception sharing. In one embodiment, a rate adaptive system for enabling perception sharing of a scene is disclosed. The system includes a priority-based encoder at a viewing system and a priority-based decoder at a remote system. The priority-based encoder includes a controller configured to: split a plurality of clusters of data in a received segmented image of the scene into one of a plurality of different predetermined labels wherein each label is assigned a predetermined priority level; vectorize the data for a plurality of the labels (e.g., convert the split data into a vector for each label, wherein each vector comprises a separate matrix in which the pixels corresponding to the label are marked and the rest of the pixels are not marked) to generate a sparse vector $x_i$ for its corresponding label that has the priority level of its corresponding label; encode a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$; and transmit the plurality of sets of the encoded information $y_i$ in a prioritized order wherein higher priority level sets of the encoded information $y_i$ are transmitted prior to lower priority level sets of the encoded information $y_i$. The priority-based decoder includes a controller configured to: receive the plurality of sets of encoded information $y_i$; decode the plurality of sets of encoded information $y_i$ to determine the plurality of the sparse vectors $\hat{x}_i$ based on determining measurement matrix $A_i(t)$; and unite the plurality of the sparse vectors $\hat{x}_i$ into a united vector; wherein the united vector can be reshaped into an approximated image of the scene comprising an approximated image segmentation.

In one embodiment, the priority-based encoder is further configured to encode the plurality of the sparse vectors $x_i$ in a prioritized order wherein higher priority level sparse vectors $x_i$ are encoded prior to lower priority level sparse vectors $x_i$.

In one embodiment, the measurement matrix $A_i(t)$ is configured to allow for data corresponding to the higher priority level sparse vectors $x_i$ to be encoded with higher resolution than data corresponding to the lower priority level sparse vectors $x_i$.

In one embodiment, the priority-based decoder is further configured to decode the plurality of sets of encoded information $y_i$ to determine the plurality of the sparse vectors $\hat{x}_i$ in a prioritized order wherein higher priority level sets of encoded information $y_i$ are decoded prior to lower priority level sets of encoded information $y_i$.

In one embodiment, the priority-based decoder is further configured to decode the plurality of sets of encoded information $y_i$ to determine the plurality of the sparse vectors $\hat{x}_i$ based on $y_i = A_i(t) x_i$ such that $\|x_i\|$ is minimal.

In one embodiment, the measurement matrix $A_i(t)$ is determined at the priority-based encoder and at the priority-based decoder based on a common seed known at both the priority-based encoder and at the priority-based decoder.

In one embodiment, dimensions of the measurement matrix $A_i(t)$ are determined at the priority-based encoder based on feedback provided by the priority-based decoder to the priority-based encoder.

In one embodiment, the prioritized encoder is configured to determine dimensions of the measurement matrix $A_i(t)$ based on estimating the sparsity level s of a label according to the number of pixels segmented with the label.

In one embodiment, the prioritized decoder is configured to determine dimensions of the measurement matrix $A_i(t)$ based on estimating the sparsity level s of a label according to the number of pixels segmented with the label.

In one embodiment, both the prioritized encoder and the prioritized decoder are further configured to determine dimensions of the measurement matrix $A_i(t)$ to be used in the next frame based on the sparsity of each label in the current frame (or last couple of frames) and subject to the sum of rates being less than or equal to a constraint.

In one embodiment, the segmented image of the scene is derived from a camera image, RADAR depth image, LiDAR depth image, or sound image; the viewing system includes an autonomous or semi-autonomously driven vehicle; and the remote system includes a cloud-based, an edge-cloud-based computing system, infrastructure, or another vehicle.

In another embodiment, a method in a rate adaptive system including a priority-based encoder at a viewing system and a priority-based decoder at a remote system for enabling perception sharing of a scene is provided. The method includes splitting, by the priority-based encoder, a plurality of clusters of data in a received segmented image of the scene according to one of a plurality of different predetermined labels wherein each label is assigned a predetermined priority level; vectorizing, by the priority-based encoder, the data for a plurality of the labels (e.g., convert the split data into a vector for each label, wherein each vector comprises a separate matrix in which the pixels corresponding to the label are marked and the rest of the pixels are not marked) to generate a sparse vector $x_i$ for its corresponding label that has the priority level of its corresponding label; encoding, by the priority-based encoder, a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$; transmitting, by the priority-based encoder to the priority-based decoder, the plurality of sets of the encoded information $y_i$ in a prioritized order, wherein higher priority level sets of the encoded information $y_i$ are transmitted prior to lower priority level sets of the encoded information $y_i$; decoding, by the priority-based decoder, the plurality of sets of encoded information $y_i$ to determine the plurality of the sparse vectors $\hat{x}_i$ based on determining measurement matrix $A_i(t)$; uniting the plurality of the sparse vectors $\hat{x}_1$ into a united vector, wherein the united vector can be reshaped into an approximated image of the scene comprising an approximated image segmentation.

In one embodiment, the encoding the plurality of the sparse vectors $x_i$ includes encoding the plurality of the sparse vectors $x_i$ in a prioritized order wherein higher priority level sparse vectors $x_i$ are encoded prior to lower priority level sparse vectors $x_i$.

In one embodiment, the measurement matrix $A_i(t)$ is configured to allow for data corresponding to the higher priority level sparse vectors $x_i$ to be encoded with higher resolution than data corresponding to the lower priority level sparse vectors $x_i$.

In one embodiment, the decoding the plurality of sets of encoded information $y_i$ includes decoding the plurality of sets of encoded information $y_i$ in a prioritized order wherein higher priority level sets of encoded information $y_i$ are decoded prior to lower priority level sets of encoded information $y_i$.

In one embodiment, the decoding the plurality of sets of encoded information $y_i$ includes decoding the plurality of sets of encoded information $y_i$ to determine the plurality of the sparse vectors $\hat{x}_i$ based on $y_i = A_i(t) x_i$ such that $\|x_i\|$ is minimal.

In one embodiment, the method further includes determining the measurement matrix $A_i(t)$ at the priority-based encoder and at the priority-based decoder based on a common seed known at both the priority-based encoder and at the priority-based decoder.

In one embodiment, the method further includes determining dimensions of the measurement matrix $A_i(t)$ at the priority-based encoder and at the priority-based decoder based on feedback provided by the priority-based decoder to the priority-based encoder.

In one embodiment, the method further includes determining dimensions of the measurement matrix $A_i(t)$ to be used in for the next frame at the priority-based encoder and the priority-based decoder based on estimating the sparsity level s of a label according to the number of pixels segmented with the label in the current frame (or last couple of frames).

In one embodiment, the method further includes determining dimensions of the measurement matrix $A_i(t)$ to be used in the next frame based on the determined sparsity for each label in the current frame (or last couple of frames) and subject to the sum of rates being less than or equal to a constraint.

In one embodiment, the segmented image of the scene is derived from a camera image, RADAR depth image, LiDAR depth image, or sound image; the viewing system includes an autonomous or semi-autonomously driven vehicle; and the remote system includes a cloud-based computing system, an edge-cloud-based computing system, infrastructure, or another vehicle.

In another embodiment, a rate adaptive system for enabling perception sharing of a scene is provided. The rate adaptive system includes a vehicle including an imaging device configured to take an image of the scene, a controller configured by a vehicle segmentation algorithm to generate a segmented image of the scene from the image of the scene, and a priority-based encoder including a controller configured to: split a plurality of clusters of data in the segmented image of the scene according to one of a plurality of different predetermined labels wherein each label is assigned a predetermined priority level; vectorize the data for a plurality of the labels (e.g., convert the split data into a vector for each label, wherein each vector comprises a separate matrix in which the pixels corresponding to the label are marked and the rest of the pixels are not marked) to generate a sparse vector $x_i$ for its corresponding label that has the priority level of its corresponding label; encode a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$; and transmit the plurality of sets of the encoded information $y_i$ in a prioritized order wherein higher priority level sets of the encoded information $y_i$ are transmitted prior to lower priority level sets of the encoded information $y_i$. The rate adaptive system further includes a priority-based decoder at a remote system including a controller configured to: receive the plurality of sets of encoded information $y_i$; decode the plurality of sets of encoded information $y_i$ to determine the plurality of the sparse vectors $\hat{x}_i$ based on determining measurement matrix $A_i(t)$; and unite the plurality of the sparse vectors $\hat{x}_i$ into a united vector, wherein the united vector can be reshaped into an approximated image of the scene comprising an approximated image segmentation.

BRIEF DESCRIPTION OF THE DRAWINGS

Aspects of the present disclosure are best understood from the following detailed description when read with the accompanying figures, wherein like numerals denote like elements.

DETAILED DESCRIPTION

Figure 1:
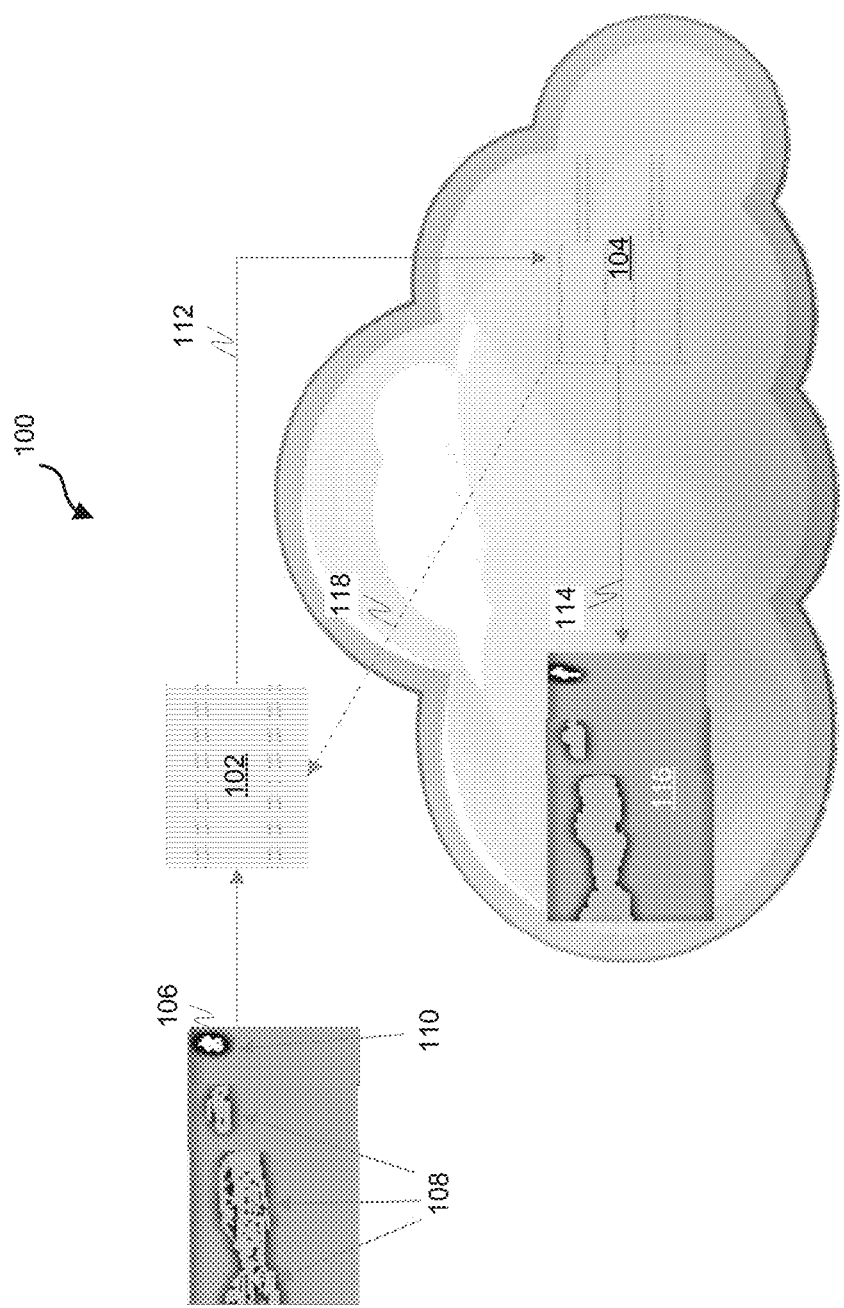
FIG. 1 is a block diagram depicting an example rate adaptive encoding/decoding system, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, mobile communication, vehicle-to-vehicle communication, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

To enable perception sharing, to either the cloud or another vehicle, compression with high rates is required. The described systems, methods, apparatus, and techniques exploit the low rank of segmented data and harness compressed sensing to reach high compression rates for image data. The described systems, methods, apparatus, and techniques can allow for the dissemination of segmentation images at nearly real-time to, e.g., neighboring vehicles, cloud-based devices, edge-cloud devices, infrastructure, etc. The described systems, methods, apparatus, and techniques provide for low complexity encoding and decoding in a rate/priority adaptive scheme. The described systems, methods, apparatus, and techniques can allow for higher priority pixels to gets encoded with higher resolution (less distortion) and for higher priority pixels to get decoded first.

The described systems, methods, apparatus, and techniques can adaptively set compressed sensing parameters to match required accuracy levels. The described systems, methods, apparatus, and techniques can utilize a common seed value for both the encoder and decoder. The exact requirements for the seed can be set in advance or, alternately, transmitted as feedback from the decoder to the encoder.

The described systems, methods, apparatus, and techniques can allow or increasing resolution of higher priority segments (e.g., according to the object's type), given an overall rate constraint. The described systems, methods, apparatus, and techniques can also allow for prioritized encoding and transmission, where segments with higher priority are encoded and transmitted with lower latency. The described systems, methods, apparatus, and techniques can also allow for prioritized decoding, where segments with higher priority are decoded with lower latency. The described systems, methods, apparatus, and techniques can provide an encoding technique that is efficient and consumes minimal computation resources and processing time. The described systems, methods, apparatus, and techniques can be applied to camera images, RADAR/LiDAR depth images, and sound images, among others.

FIG. 1 is a block diagram depicting an example rate adaptive encoding/decoding system 100 that can enable perception sharing of an image (e.g., camera image, RADAR/LiDAR depth image, or sound image) of a perceived scene from a viewing system, such as a first vehicle or an infrastructure-based system (e.g., traffic light or signage), with a view of the scene to a remote system, such as a cloud-based system, an infrastructure based system, another vehicle, or an edge-cloud-based system. The example rate adaptive encoding/decoding system 100 includes a priority-based encoder 102 at the viewing system and a priority-based decoder 104 at the remote system.

In this example, an image 106 of the perceived scene is provided by the viewing system as an image with original segmentation. The image 106 includes three clusters of pixels that identify the location of three vehicles 108 and a cluster of pixels that identifies a cyclist 110. The image 106 is received by the priority-based encoder 102, which encodes the image as an encoded image 112 with a high compression ratio. The encoded image 112 is transmitted (e.g., via known wireless techniques) to the priority-based decoder 104. The priority-based decoder 104 decodes the image 112 as a fully segmented image 114, which can be stored at the remote system as an image 116 with decoded segmentation. The priority-based encoder 102 can encode the image 106 using a predetermined seed value that is known to the priority-based decoder 104. Alternatively, the priority-based encoder 102 can encode the image 106 using a seed value derived from optional feedback 118 provided from the priority-based decoder 104. In either case, the priority-based decoder 104 can decode the encoded image 112 based on the same seed value as that used during encoding of the image 106 by the priority-based encoder 102.

Figure 2:
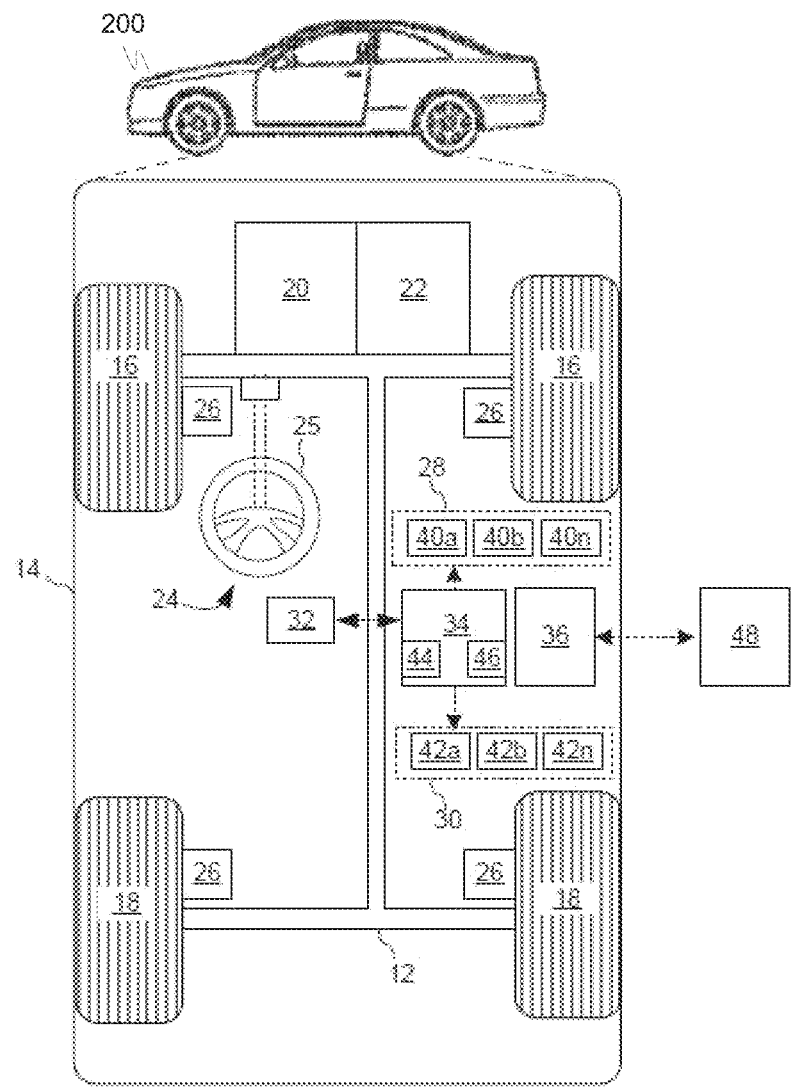
FIG. 2 is a block diagram of an example vehicle that can implement a priority-based encoder and/or a priority-based decoder, in accordance with some embodiments.

FIG. 2 is a block diagram of an example vehicle 200 that can implement a priority-based encoder 102 and/or a priority-based decoder 104. The vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 200 may be capable of being driven manually, autonomously and/or semi-autonomously.

The vehicle 200 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48 (e.g., other vehicle, infrastructure, edge-cloud-based system, cloud-based system).

The data storage device 32 stores data for use in automatically controlling the vehicle 200. The data storage device 32 may be part of the controller 34, separate from the controller 34, or part of the controller 34 and part of a separate system.

The controller 34 includes at least one processor 44 and a computer-readable storage device or media 46. In various embodiments, controller 34 implements a priority-based encoder 102 and/or a priority-based decoder 104. Although only one controller 34 is shown in FIG. 2, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200.

The processor 44 may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which comprises an ordered listing of executable instructions for implementing logical functions.

Figure 3:
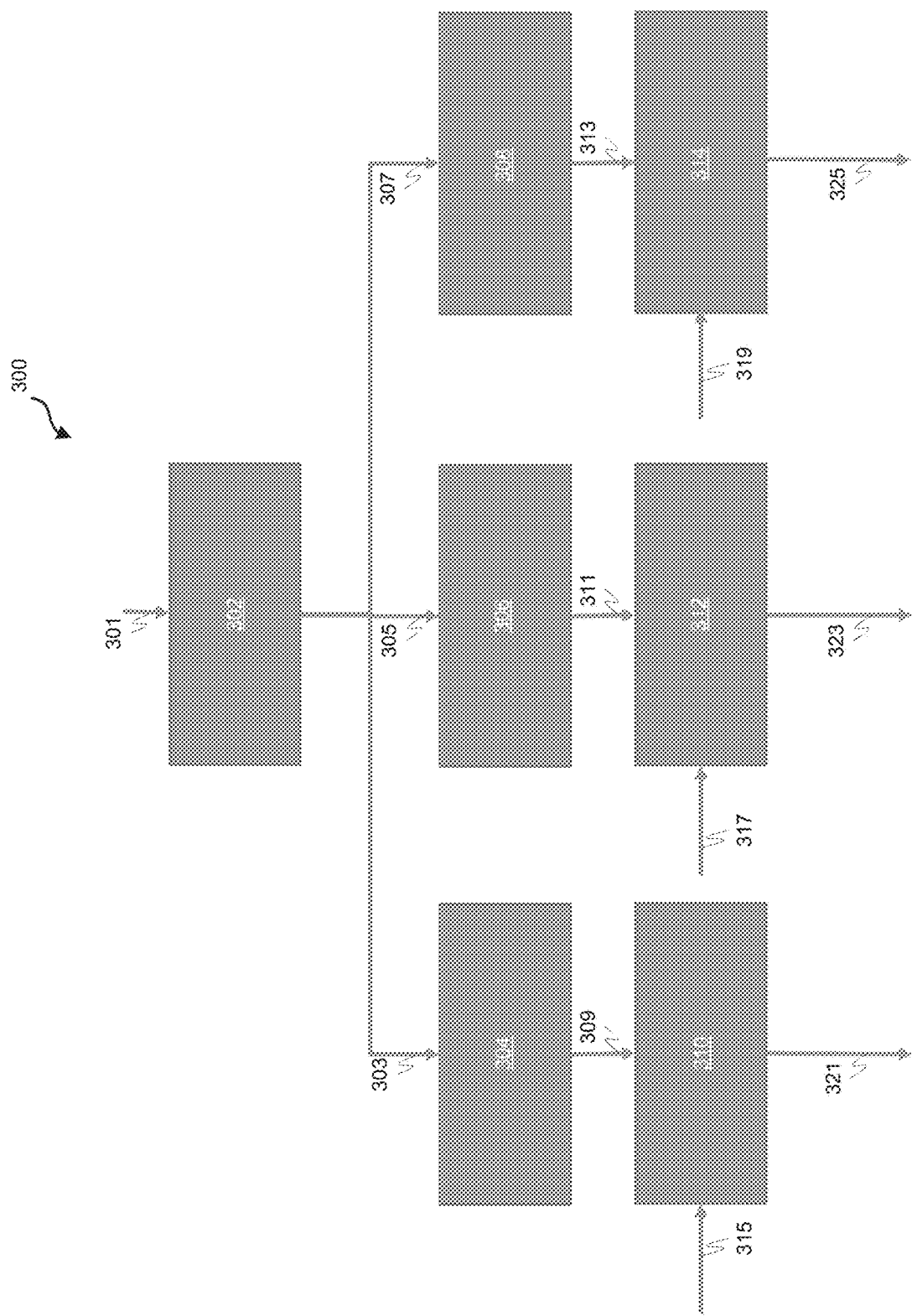
FIG. 3 is a process flow chart depicting an example process in a priority-based encoder, in accordance with some embodiments.

FIG. 3 is a process flow chart depicting an example process 300 in a priority-based encoder. The encoder may be implemented by a controller configured by programming instructions encoded on non-transitory computer readable media configurable to cause one or more processors in the controller to perform the example process 300. The order of operation within process 300 is not limited to the sequential execution as illustrated in the FIG. 3 but may be performed in one or more varying orders as applicable and in accordance with the present disclosure.

The example process 300 includes splitting (or categorizing) clusters of pixels in a received segmented image 301 according to labels applied to the clusters of pixels (operation 302). Because the segmented image 301 includes sparse data (e.g., each cluster of pixels), the encoder can concentrate on the sparse data. In this example, there are three labels, a pedestrians label (303) assigned a priority of level 1, a cyclist label (305) assigned a priority of level 2, and a vehicles label (307) assigned a priority level of 3. The segmented image is split according to the labels.

The example process 300 includes vectorization (operations 304, 306, 308). The sparse data is received in the form of a frame of the segmented image 301. The frame of data is split (operation 302) based on labels and the split data is converted into vectors (e.g., vectorized), one vector for each label. In one example, vectorization (e.g., converting the split data into vectors) involves providing a separate matrix (e.g., a zero-one matrix) for each label in which some of the pixels are marked (with the value of one) and the rest of the pixels are not marked (the pixels have a value of zero). Each of these matrices is vectorized because each matrix is associated with a single label and the only pixels that are marked are the pixels that correspond to the associated label for the matrix.

In the illustrated example, the data from the splitting that is labeled "pedestrians" is vectorized (operation 304) into a first sparse vector $x_1$ (309), the data from the splitting that is labeled "cyclist" is vectorized (operation 306), into a second sparse vector $x_2$ (311) and the data from the splitting that is labeled "vehicles" is vectorized (operation 308) into a third sparse vector $x_3$ (313). The vectorization operations (operations 304, 306, 308) may be performed in parallel or sequentially (e.g., on a prioritized basis) based on computational capabilities at the prioritized encoder.

The example process 300 includes generating encoded information to be transmitted (operations 310, 312, 314). The encoded information to be transmitted comprises a set of encoded information $y_i$ for each sparse vector $x_i$. Each set of encoded information $y_i$ is generated by multiplying a measurement matrix $A_i(t)$ with a sparse vector $x_i$. The measurement matrix $A_i(t)$ is configurable according to the estimated sparsity level of the respective label and the required accuracy level. A higher priority level sparse vector might require higher accuracy levels which will manifest in the dimensions of the corresponding measurement matrix. In this example, a first set of encoded information $y_1$ (321) for the first sparse vector $x_1$ (309) is generated (operation 310) by multiplying a first measurement matrix $A_1(t)$ (315) with the first sparse vector $x_1$ (e.g., $y_1 = A_1(t) \, x_1$), a second set of encoded information $y_2$ (323) for the second sparse vector $x_2$ (311) is generated (operation 312) by multiplying a second measurement matrix $A_2(t)$ (317) with the second sparse vector $x_2$ (e.g., $y_2 = A_2(t) \, x_2$), and a third set of encoded information $y_3$ (325) for the third sparse vector $x_3$ (313) is generated (operation 314) by multiplying a third measurement matrix $A_3(t)$ (319) with the third sparse vector $x_3$ (e.g., $y_3 = A_3(t) \, x_3$). The three sets of encoded information ($y_1$, $y_2$, $y_3$) may be generated in parallel or sequentially (e.g., on a prioritized basis) based on computational capabilities at the prioritized encoder. The three sets of encoded information ($y_1$, $y_2$, $y_3$) may be transmitted in priority order (e.g., via known wireless techniques) to a priority-based decoder at a remote location for decoding, reconstruction, and storage of an image of a scene corresponding to the segmented image 301.

The encoding process producing the encoded information ($y_1$, $y_2$, $y_3$) may be performed on a prioritized basis, wherein the higher priority information (e.g., priority 1 information $y_1$) may be encoded and/or transmitted first based on computational and/or transmission capabilities at the prioritized encoder, the next higher priority information (e.g., priority 2 information $y_2$) may be encoded and/or transmitted next based on computational and/or transmission capabilities at the prioritized encoder, and the third higher priority information (e.g., priority 3 information $y_3$) may be encoded and/or transmitted third based on computational and/or transmission capabilities at the prioritized encoder. This may ensure that the higher priority information is received at the lowest possible latency at the prioritized decoder when computational and/or transmission constraints exist.

Figure 4:
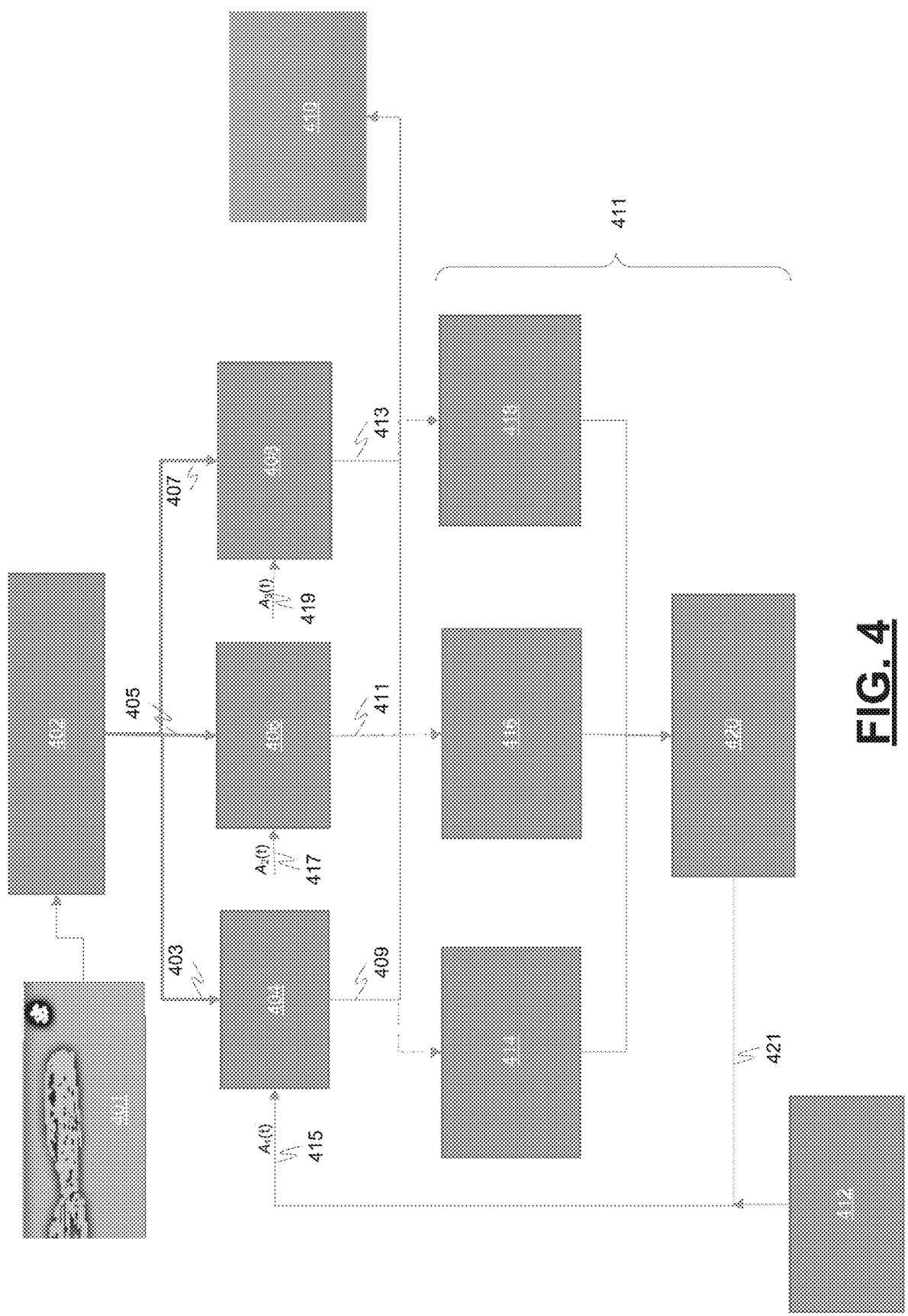
FIG. 4 is a process flow chart depicting another example process in a priority-based encoder, in accordance with some embodiments.

FIG. 4 is a process flow chart depicting an example process 400 in a priority-based encoder. The encoder may be implemented by a controller configured by programming instructions encoded on non-transitory computer readable media configurable to cause one or more processors in the controller to perform the example process 400. The order of operation within process 400 is not limited to the sequential execution as illustrated in the FIG. 4 but may be performed in one or more varying orders as applicable and in accordance with the present disclosure.

The example process 400 includes splitting (or categorizing) clusters of pixels in a frame of data from a received segmented image 401 into layers (of sparse data vectors $x_i$) according to labels applied to the clusters of pixels (operation 402). In this example, there are three labels, a pedestrians label (403) assigned a priority of level 1, a cyclist label (405) assigned a priority of level 2, and a vehicles label (407) assigned a priority level of 3. The sparse data is split based on label into one of the three layers.

The splitting operations, in this example, includes vectorization. The sparse data is received in the form of a frame of the segmented image 401. The frame of data is split based on labels and the split data is converted into vectors (e.g., vectorized), one vector for each label. In this example, the data from the splitting that is labeled "pedestrians" is vectorized into a first sparse vector $x_1$, the data from the splitting that is labeled "cyclist" is vectorized into a second sparse vector $x_2$ and the data from the splitting that is labeled "vehicles" is vectorized into a third sparse vector $x_3$. The vectorization operations may be performed in parallel or sequentially (e.g., on a prioritized basis) based on computational capabilities at the prioritized encoder.

The example process 400 includes encoding the frame of data, on a layer-by-layer basis, to generate encoded information to be transmitted (operations 404, 406, 408). The encoded information to be transmitted comprises a set of encoded information $y_i$ for each sparse vector $x_i$. Each set of encoded information $y_i$ is generated by multiplying a measurement matrix $A_i(t)$ with a sparse vector $x_i$. The measurement matrix $A_i(t)$ is configurable according to the estimated sparsity level of the respective label and the required accuracy level. A higher priority level sparse vector might require higher accuracy levels which will manifest in the dimensions of the corresponding measurement matrix. In this example, a first set of encoded information $y_i$ (409) for the first sparse vector $x_1$ is generated (operation 404) by multiplying a first measurement matrix $A_1(t)$ (415) with the first sparse vector $x_1$ (e.g., $y_1=A_1(t) x_1$), a second set of encoded information $y_2$ (411) for the second sparse vector $x_2$ is generated (operation 406) by multiplying a second measurement matrix $A_2(t)$ (417) with the second sparse vector $x_2$ (e.g., $y_2=A_2(t) x_2$), and a third set of encoded information $y_3$ (413) for the third sparse vector $x_3$ is generated (operation 408) by multiplying a third measurement matrix $A_3(t)$ (419) with the third sparse vector $x_3$ (e.g., $y_3=A_3(t) x_3$). The three sets of encoded information ($y_1$, $y_2$, $y_3$) may be generated in parallel or sequentially (e.g., on a prioritized basis) based on computational capabilities at the prioritized encoder.

The encoding process producing the encoded information ($y_1$, $y_2$, $y_3$) may be performed on a prioritized basis, wherein the higher priority information (e.g., priority 1 information $y_i$) is encoded first, the next higher priority information (e.g., priority 2 information $y_2$) is encoded next, and the third higher priority information (e.g., priority 3 information $y_3$) is encoded third. This may ensure that the higher priority information is always encoded first when computational constraints exist.

The three sets of encoded information ($y_1$, $y_2$, $y_3$) are sorted by priority and transmitted (e.g., via known wireless techniques) to a priority-based decoder (operation 410) at a remote location for decoding, reconstruction, and storage of an image of a scene corresponding to the segmented image 401.

The transmission of the encoded information ($y_1$, $y_2$, $y_3$) may be performed on a prioritized basis, wherein the higher priority information (e.g., priority 1 information $y_1$) is transmitted first, the next higher priority information (e.g., priority 2 information $y_2$) is transmitted next, and the third higher priority information (e.g., priority 3 information $y_3$) is transmitted third. This may ensure that the higher priority information is received at the prioritized decoder at the lowest possible latency.

The example process 400 also includes operations to generate the measurement matrices $A_i(t)$ (operations 411). For the initial frame (e.g., at time t=0), a random matrix $A_0$ is generated with m rows (e.g., a common seed) for each label (operation 412). This random matrix $A_0$ is used to encode each frame by $y_i=A_0(t) x_1$. The prioritized encoder and the prioritized decoder can use the same seed to generate this random matrix $A_0$. This ensures that the prioritized decoder can decode the encode information to reconstruct the encoded data. The same random matrix $A_0$ is not required for each label, nor are matrices of the same dimensions required for each label. Prior understanding may be used to determine initial dimensions for each label that are not the same. Having preset parameters and a common seed can allow for randomly generating the same measurement matrices for each label at both ends (encoder and decoder).

For each frame, the process 400 includes decoding the previously generated frame by finding $\hat{x}_1$ based on $y_1=A_1(t) x_1$ such that $\|x_1\|$ is minimal (operation 414), $\hat{x}_2$ based on $y_2=A_2(t) x_2$ such that $\|x_2\|$ is minimal (operation 416), and $\hat{x}_3$ based on $y_3=A_3(t) x_3$ such that $\|x_3\|$ is minimal (operation 418). Operations 414, 416, 418 may be performed in parallel or sequentially (e.g., on a prioritized basis) based on computational capabilities at the prioritized encoder.

Based on the decoding operations (414, 416, 418), the process 400 includes determining the number of rows allocated to each label in the next frame subject to the sum of rates being less than or equal to a constraint (sum of rates≤constraint) (operation 420). This results in the generation of the next measurement matrix $A_t=[A_1(t)|A_2(t)|A_3(t)]$ (421) used for encoding the next frame of data. These measurement matrices are randomly picked based on a common seed. The estimated sparsity is determined by examining the sparsity of each label in the previous frame and using it with the accuracy (and priority) to determine the number of rows of each measurement matrix for each label. The operations 411 provide repeatable operations that may be used by a prioritized decoder to decode and reconstruct the encoded information.

Figure 5:
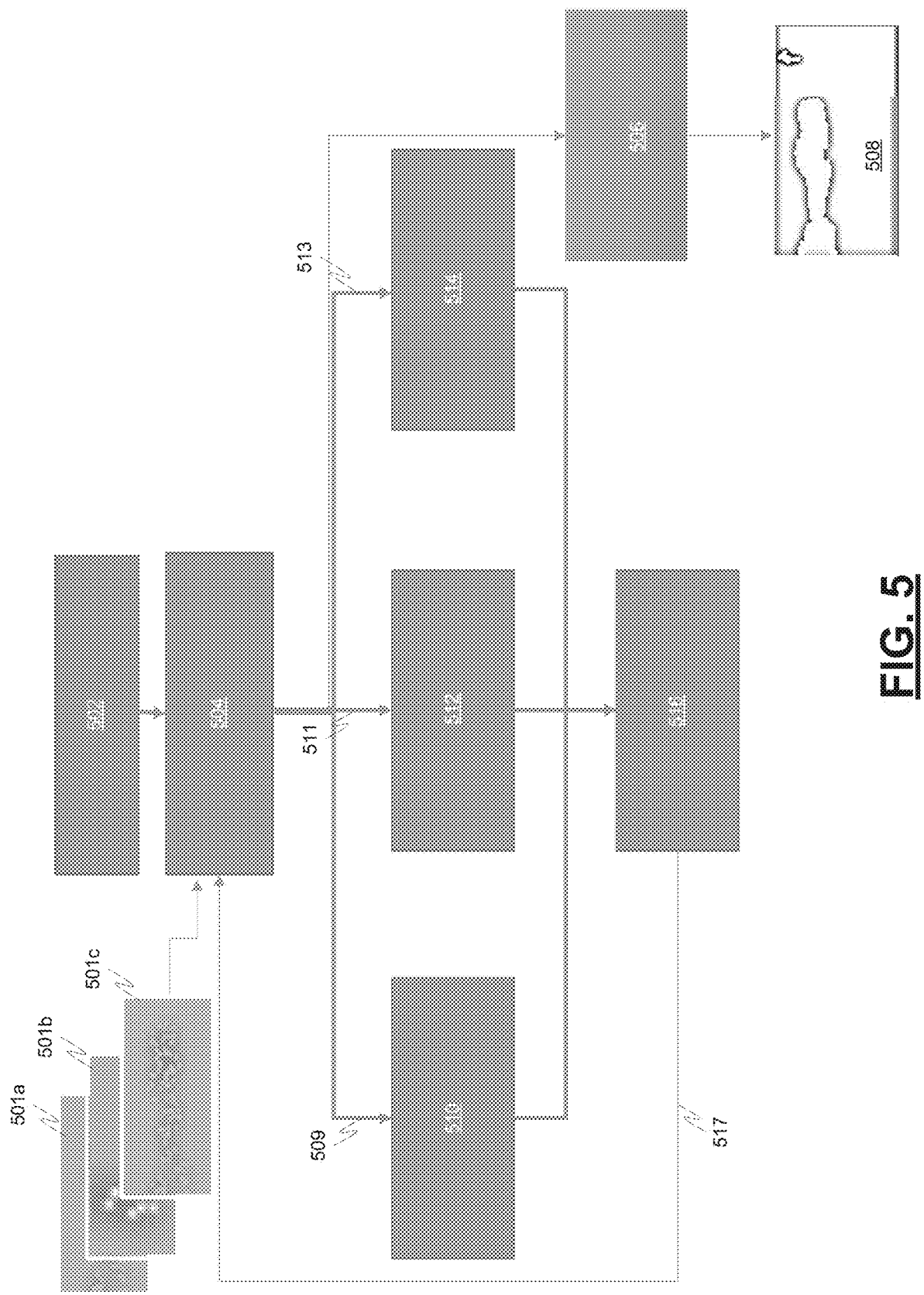
FIG. 5 is a process flow chart depicting an example process in a priority-based decoder, in accordance with some embodiments.

FIG. 5 is a process flow chart depicting an example process 500 in a priority-based decoder. The decoder may be implemented by a controller configured by programming instructions encoded on non-transitory computer readable media configurable to cause one or more processors in the controller to perform the example process 500. The order of operation within process 500 is not limited to the sequential execution as illustrated in the FIG. 5 but may be performed in one or more varying orders as applicable and in accordance with the present disclosure.

The example process 500 includes generating, for the initial frame (e.g., at time t=0), a random measurement matrix $A_0$ with m rows (e.g., a common seed) for each label (operation 502). This random matrix $A_0$ is used to decode each category of labeled data. The prioritized encoder and the prioritized decoder use the same seed to generate the same measurement matrix $A_0$. This ensures that the prioritized decoder can decode the encoded information to reconstruct the encoded data. The same random matrix $A_0$ is not required for each label, nor are matrices of the same dimensions required for each label. Prior understanding may be used to determine initial dimensions for each label that are not the same. Having preset parameters and a common seed can allow for randomly generating the same measurement matrices for each label at both ends (encoder and decoder).

The example process 500 includes receiving a plurality of sets (501a, 501b, 501c) of encoded information ($y_1$, $y_2$, $y_3$) and decoding the encoded information ($y_1$, $y_2$, $y_3$) to determine each sparse data vector $\hat{x}_i$ based on $y_i = A_i(t) x_i$ such that $\|x_i\|_1$ is minimal (operation 504). In this example, this involves determining the first sparse data vector $\hat{x}_1$ based on $y_1 = A_1(t) x_1$ such that $\|x_1\|$ is minimal, determining the second sparse data vector $\hat{x}_2$ based on $y_2 = A_2(t) x_2$ such that $\|x_2\|$ is minimal, and determining the third sparse data vector $\hat{x}_3$ based on $y_3 = A_3(t) x_3$ such that $\|x_3\|$ is minimal. The decoding of the encoded information $y_1$ to find the sparse data vector $\hat{x}_1$, may be performed in parallel or sequentially (e.g., on a prioritized basis) with the decoding of encoded information $y_2$ to find the sparse data vector $\hat{x}_2$, and/or in parallel or sequentially (e.g., on a prioritized basis) with the decoding of encoded information $y_3$ to find the sparse data vector $\hat{x}_3$ in view of computational capabilities at the prioritized encoder and/or the timing by which the encoded information is received at the decoder.

The example process 500 includes uniting the layers (e.g., the first sparse data vector $\hat{x}_1$, the second sparse data vector $\hat{x}_2$, and the third sparse data vector $\hat{x}_3$) into a single frame (e.g., united vector) (operation 506). The united vector can be reshaped into an approximated image of the scene 508 comprising an approximated image segmentation.

The decoding operations 504 are dependent on a determination of the measurement matrices A; performed at the prioritized decoder. For each label, the example process 500 includes estimating the sparsity level s according to the number of pixels segmented with the label (operations 510, 512, 514). The estimation is based on the decoded image. Thus, in this example, for label 1 (509) the example process 500 includes estimating the sparsity level s according to the number of pixels segmented with the pedestrians label (operation 510), for label 2 (511) the example process 500 includes estimating the sparsity level s according to the number of pixels segmented with the cyclist label (operation 512), and for label 3 (513) the example process 500 includes estimating the sparsity level s according to the number of pixels segmented with the vehicles label (operation 514).

The example process 500 includes determining the number of rows allocated to each label in the next frame subject to the sum of rates being less than or equal to a constraint (sum of rates≤constraint) (operation 516). This results in the generation of the next measurement matrix $A_t = [A_1(t)|A_2(t)|A_3(t)]$ (517) used for encoding the next frame of data. Once the number of rows are determined the matrices are randomly generated using a common seed, so that they match at both ends. The operations 510, 512, 514, 516 provide repeatable operations that allows the prioritized decoder to decode and reconstruct the encoded information using the same matrices used in the prioritized encoder to encode the encoded information.

Figure 6:
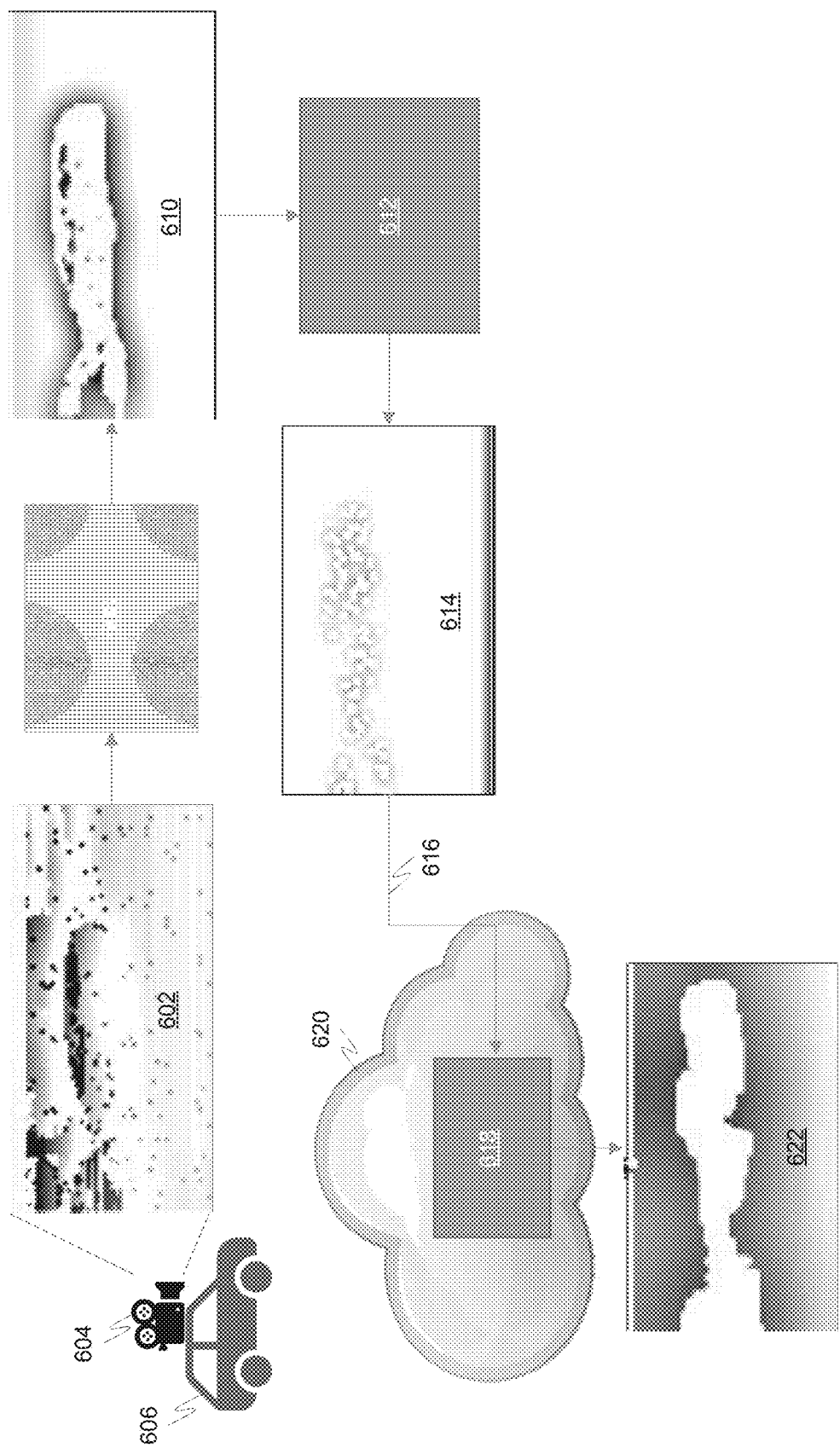
FIG. 6 is a process flow chart depicting an example process for perception sharing, in accordance with some embodiments.

FIG. 6 is a process flow chart depicting an example process 600 for perception sharing. The example process includes capturing an image 602 of a scene by imaging equipment 604 of a vehicle 606. The image 602 may comprise camera images, RADAR/LiDAR depth images, sound images, or others.

The example process 600 includes applying a segmentation algorithm (operation 608) to the original image 602 to produce a segmentation result 610. The example process 600 includes applying an encoder 612 to the segmentation result 610 to generate an encoded segmentation 614. The encoder 612 may be configured to apply an encoding process such as that depicted in FIGS. 3 and/or 4 to generate the encoded segmentation 614.

The example process 600 includes transmitting the encoded segmentation 614 via a wireless link 616 to a decoder 618 at a remote site, such as a cloud-based server 620. The decoder 618 may be configured to apply a decoding process such as that depicted in FIG. 5 to generate a decoded segmentation 622.

Figure 7:
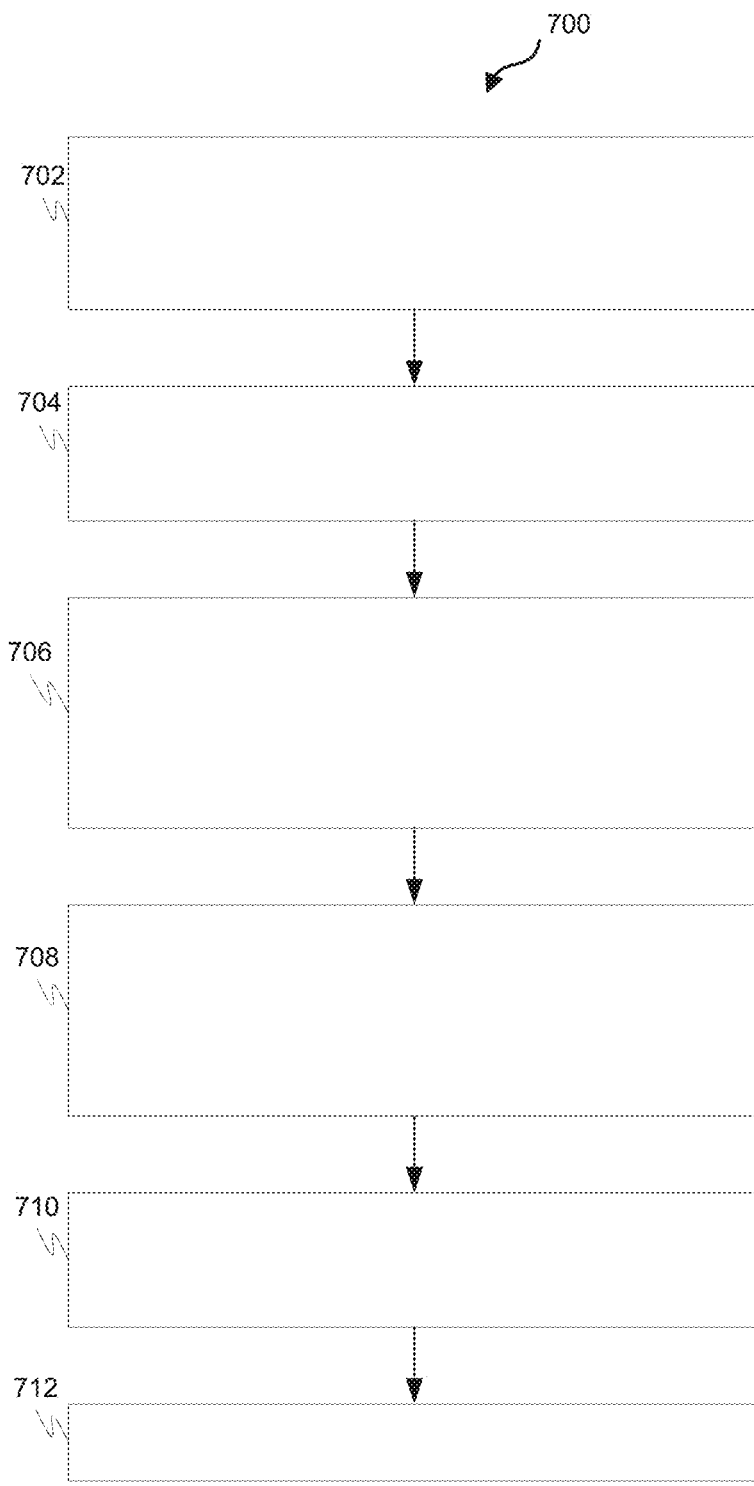
FIG. 7 is a process flow chart depicting an example process in a rate adaptive system comprising a priority-based encoder at a viewing system and a priority-based decoder at a remote system for enabling perception sharing of a scene, in accordance with some embodiments.

FIG. 7 is a process flow chart depicting an example process 700 in a rate adaptive system comprising a priority-based encoder at a viewing system and a priority-based decoder at a remote system for enabling perception sharing of a scene. The order of operation within process 700 is not limited to the sequential execution as illustrated in the FIG. 7 but may be performed in one or more varying orders as applicable and in accordance with the present disclosure.

The example process 700 includes splitting, by the priority-based encoder, a plurality of clusters of data in a received segmented image of the scene into one of a plurality of different predetermined labels wherein each label is assigned a predetermined priority level (operation 702).

The example process 700 includes vectorizing, by the priority-based encoder, the data for a plurality of the labels to generate a sparse vector $x_i$ for its corresponding label that has the priority level of its corresponding label (operation 704). In this example, vectorizing comprises converting the split data into a vector for each label, wherein each vector comprises a separate matrix in which the pixels corresponding to the label are marked and the rest of the pixels are not marked.

The example process 700 includes encoding, by the priority-based encoder, a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$ (operation 706). The encoding of the plurality of the sparse vectors $x_i$ may comprise encoding the plurality of the sparse vectors $x_i$ in a prioritized order wherein higher priority level sparse vectors $x_i$ are encoded prior to lower priority level sparse vectors $x_i$. The measurement matrix $A_i(t)$ may be configured to allow for data corresponding to the higher priority level sparse vectors $x_i$ to be encoded with higher resolution than data corresponding to the lower priority level sparse vectors $x_i$.

The example process 700 includes transmitting, by the priority-based encoder to the priority-based decoder, the plurality of sets of the encoded information $y_i$ in a prioritized order, wherein higher priority level sets of the encoded information $y_i$ are transmitted prior to lower priority level sets of the encoded information $y_i$ (operation 708).

The example process 700 includes decoding, by the priority-based decoder, the plurality of sets of encoded information $y_i$ to determine the plurality of the sparse vectors $\hat{x}_i$ based on determining measurement matrix $A_i(t)$ (operation 710). The decoding of the plurality of sets of encoded information $y_i$ may comprise decoding the plurality of sets of encoded information $y_i$ in a prioritized order wherein higher priority level sets of encoded information $y_i$ are decoded prior to lower priority level sets of encoded information $y_i$. The decoding of the plurality of sets of encoded information $y_i$ may comprise decoding the plurality of sets of encoded information $y_i$ to determine the plurality of the sparse vectors $\hat{x}_i$ based on $y_i = A_i(t) x_i$ such that $\|x_i\|$ is minimal. The measurement matrix $A_i(t)$ at the priority-based encoder and at the priority-based decoder may be determined based on a common seed known at both the priority-based encoder and at the priority-based decoder. The dimensions of the measurement matrix $A_i(t)$ at the priority-based encoder and at the priority-based decoder may be determined based on feedback provided by the priority-based decoder to the priority-based encoder. The dimensions of the measurement matrix $A_i(t)$ may be determined based on estimating the sparsity level s of a label according to the number of pixels segmented with the label in the previous frame(s). Given the estimated sparsity, required accuracy (priority) and the sum rate constraint (having the sum rate be less than or equal to a constraint), the number of rows of each measurement matrix can be determined deterministically at both ends. The measurement matrices can then be randomly generated based on the same seed, thus providing the same measurement matrices at both ends.

The example process 700 includes uniting the plurality of the sparse vectors $\hat{x}_i$ into a single image frame (e.g., united vector) (operation 712), wherein the united vector can be reshaped into an approximated image of the scene comprising an approximated image segmentation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A rate adaptive system for enabling perception sharing of a scene, the system comprising:
    a priority-based encoder at a viewing system comprising a controller configured to:
        split a plurality of clusters of data in a received segmented image of the scene according to one of a plurality of different predetermined labels wherein each label is assigned a predetermined priority level;
        vectorize the data for a plurality of the labels to generate a sparse vector $x_i$ for its corresponding label that has the priority level of its corresponding label;
        encode a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$, wherein the measurement matrix $A_i(t)$ is configured to allow for data corresponding to higher priority level sparse vectors $x_i$ to be encoded with higher resolution than data corresponding to lower priority level sparse vectors $x_i$; and
        transmit the plurality of sets of the encoded information $y_i$ in a prioritized order wherein higher priority level sets of the encoded information $y_i$ are transmitted prior to lower priority level sets of the encoded information $y_i$; and
    a priority-based decoder at a remote system comprising a controller configured to:
        receive the plurality of sets of encoded information $y_i$;
        decode the plurality of sets of encoded information $y_i$ to determine a plurality of sparse vectors $\hat{x}_i$ based on determining measurement matrix $A_i(t)$; and
        unite the plurality of sparse vectors $\hat{x}_i$ into a united vector;
    wherein the united vector can be reshaped into an approximated image of the scene comprising an approximated image segmentation.

2. The rate adaptive system of claim 1, wherein the priority-based encoder is further configured to encode the plurality of the sparse vectors $x_i$ in a prioritized order wherein higher priority level sparse vectors $x_i$ are encoded prior to lower priority level sparse vectors $x_i$.

3. The rate adaptive system of claim 1, wherein the priority-based decoder is further configured to decode the plurality of sets of encoded information $y_i$ to determine the plurality of sparse vectors $\hat{x}_i$ in a prioritized order wherein higher priority level sets of encoded information $y_i$ are decoded prior to lower priority level sets of encoded information $y_i$.

4. The rate adaptive system of claim 1, wherein the priority-based decoder is further configured to decode the plurality of sets of encoded information $y_i$ to determine the plurality of sparse vectors $\hat{x}_i$ based on $y_i = A_i(t) x_i$ such that $\|x_i\|$ is minimal.

5. The rate adaptive system of claim 1, wherein the measurement matrix $A_i(t)$ is determined at the priority-based encoder and at the priority-based decoder based on a common seed known at both the priority-based encoder and at the priority-based decoder.

6. The rate adaptive system of claim 1, wherein dimensions of the measurement matrix $A_i(t)$ are determined at the priority-based encoder based on feedback provided by the priority-based decoder to the priority-based encoder.

7. The rate adaptive system of claim 1, wherein both the prioritized encoder and the prioritized decoder are configured to determine dimensions of the measurement matrix $A_i(t)$ based on estimating a sparsity level s of a label according to a number of pixels segmented with the label.

8. The rate adaptive system of claim 7, wherein both the prioritized encoder and the prioritized decoder are further configured to determine dimensions of the measurement matrix $A_i(t)$ to be used in a next frame based on the sparsity of each label in a current frame and subject to a sum of rates being less than or equal to a constraint.

9. The rate adaptive system of claim 1, wherein:
    the segmented image of the scene is derived from a camera image, RADAR depth image, LiDAR depth image, or sound image;
    the viewing system comprises an autonomous or semi-autonomously driven vehicle; and
    the remote system comprises another vehicle, a cloud-based computing system, infrastructure, or an edge-cloud-based computing system.

10. A method in a rate adaptive system comprising a priority-based encoder at a viewing system and a priority-based decoder at a remote system for enabling perception sharing of a scene, the method comprising:
    splitting, by the priority-based encoder, a plurality of clusters of data in a received segmented image of the scene according to one of a plurality of different predetermined labels wherein each label is assigned a predetermined priority level;
    vectorizing, by the priority-based encoder, the data for a plurality of the labels to generate a sparse vector $x_i$ for its corresponding label that has the priority level of its corresponding label;

encoding, by the priority-based encoder, a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$, wherein the measurement matrix $A_i(t)$ is configured to allow for data corresponding to higher priority level sparse vectors $x_i$ to be encoded with higher resolution than data corresponding to lower priority level sparse vectors $x_i$;

transmitting, by the priority-based encoder to the priority-based decoder, the plurality of sets of the encoded information $y_i$ in a prioritized order, wherein higher priority level sets of the encoded information $y_i$ are transmitted prior to lower priority level sets of the encoded information $y_i$;

decoding, by the priority-based decoder, the plurality of sets of encoded information $y_i$ to determine a plurality of sparse vectors $\hat{x}_i$ based on determining measurement matrix $A_i(t)$;

uniting the plurality of sparse vectors $\hat{x}_i$ into a united vector, wherein the united vector can be reshaped into an approximated image of the scene comprising an approximated image segmentation.

11. The method of claim 10, wherein the encoding the plurality of the sparse vectors $x_i$ comprises encoding the plurality of the sparse vectors $x_i$ in a prioritized order wherein higher priority level sparse vectors $x_i$ are encoded prior to lower priority level sparse vectors $x_i$.

12. The method of claim 10, wherein the decoding the plurality of sets of encoded information $y_i$ comprises decoding the plurality of sets of encoded information $y_i$ in a prioritized order wherein higher priority level sets of encoded information $y_i$ are decoded prior to lower priority level sets of encoded information $y_i$.

13. The method of claim 10, wherein the decoding the plurality of sets of encoded information $y_i$ comprises decoding the plurality of sets of encoded information $y_i$ to determine the plurality of sparse vectors $\hat{x}_i$ based on $y_i = A_i(t) x_i$ such that $\|x_i\|$ is minimal.

14. The method of claim 10, further comprising determining the measurement matrix $A_i(t)$ at the priority-based encoder and at the priority-based decoder based on a common seed known at both the priority-based encoder and at the priority-based decoder.

15. The method of claim 10, further comprising determining dimensions of the measurement matrix $A_i(t)$ at the priority-based encoder and at the priority-based decoder based on feedback provided by the priority-based decoder to the priority-based encoder.

16. The method of claim 10, further comprising determining dimensions of the measurement matrix $A_i(t)$ to be used for a next frame at the priority-based encoder and the priority-based decoder based on estimating a sparsity level s of a label according to a number of pixels segmented with the label in a current frame.

17. The method of claim 16, further comprising determining dimensions of the measurement matrix $A_i(t)$ to be used in the next frame based on the determined sparsity for each label in the current frame and subject to a sum of rates being less than or equal to a constraint.

18. A rate adaptive system for enabling perception sharing of a scene, the system comprising:

a vehicle comprising an imaging device configured to take an image of the scene, a controller configured by a vehicle segmentation algorithm to generate a segmented image of the scene from the image of the scene, and a priority-based encoder comprising a controller configured to:

split a plurality of clusters of data in the segmented image of the scene according to one of a plurality of different predetermined labels wherein each label is assigned a predetermined priority level;

vectorize the data for a plurality of the labels to generate a sparse vector $x_i$ for its corresponding label that has the priority level of its corresponding label;

encode a plurality of the sparse vectors $x_i$ by multiplying a measurement matrix $A_i(t)$ with the sparse vector $x_i$ to generate a set of encoded information $y_i$ for the corresponding label that has the priority level of its corresponding label to generate a plurality of sets of the encoded information $y_i$, wherein the measurement matrix $A_i(t)$ is configured to allow for data corresponding to higher priority level sparse vectors $x_i$ to be encoded with higher resolution than data corresponding to lower priority level sparse vectors $x_i$; and transmit the plurality of sets of the encoded information $y_i$ in a prioritized order wherein higher priority level sets of the encoded information $y_i$ are transmitted prior to lower priority level sets of the encoded information $y_i$; and a priority-based decoder at a remote system comprising a controller configured to:

receive the plurality of sets of encoded information $y_i$;

decode the plurality of sets of encoded information $y_i$ to determine a plurality of sparse vectors $\hat{x}_i$ based on determining measurement matrix $A_i(t)$; and unite the plurality of sparse vectors $\hat{x}_i$ into a single united vector;

wherein the united vector can be reshaped into an approximated image of the scene comprising an approximated image segmentation.

19. The rate adaptive system of claim 18, wherein both the prioritized encoder and the prioritized decoder are configured to determine dimensions of the measurement matrix $A_i(t)$ based on estimating a sparsity level s of a label according to a number of pixels segmented with the label.

20. The rate adaptive system of claim 19, wherein both the prioritized encoder and the prioritized decoder are further configured to determine dimensions of the measurement matrix $A_i(t)$ to be used in a next frame based on the sparsity of each label in a current frame and subject to a sum of rates being less than or equal to a constraint.

* * * * *